United States Patent
Chowdhary et al.

(10) Patent No.: US 10,142,789 B2
(45) Date of Patent: *Nov. 27, 2018

(54) RECONFIGURABLE SENSOR UNIT FOR ELECTRONIC DEVICE

(71) Applicant: STMicroelectronics, Inc., Coppell, TX (US)

(72) Inventors: Mahesh Chowdhary, San Jose, CA (US); Sankalp Dayal, Santa Clara, CA (US)

(73) Assignee: STMicroelectronics, Inc., Coppell, TX (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/132,521

(22) Filed: Apr. 19, 2016

(65) Prior Publication Data

US 2016/0255017 A1   Sep. 1, 2016

Related U.S. Application Data

(63) Continuation-in-part of application No. 14/749,118, filed on Jun. 24, 2015.

(60) Provisional application No. 62/121,104, filed on Feb. 26, 2015.

(51) Int. Cl.
  *G01P 15/00* (2006.01)
  *H04W 4/02* (2018.01)
  *H04W 88/02* (2009.01)

(52) U.S. Cl.
  CPC ........... *H04W 4/026* (2013.01); *H04W 4/027* (2013.01); *H04W 88/02* (2013.01)

(58) Field of Classification Search
  CPC .. G06F 1/163; G06F 17/30867; G06F 3/0619; G06F 11/1068; G06F 3/064; G06F 3/0679; G06F 19/3418; G06F 1/1647; G06F 21/32; G06F 3/011; G06F 3/0416; G06F 3/04847; G06F 3/0659; G06F 3/1423
  See application file for complete search history.

(56) References Cited

U.S. PATENT DOCUMENTS

2011/0215952 A1   9/2011   Aria et al.
2014/0201126 A1   7/2014   Zadeh et al.

Primary Examiner — Roy Y Yi
(74) Attorney, Agent, or Firm — Crowe & Dunlevy

(57) ABSTRACT

Disclosed herein is a sensor chip including at least one sensing device and a control circuit. The control circuit is configured to receive configuration data as input, and acquire data from the at least one sensing device in accordance with the configuration data. The control circuit classifies a context of the at least one sensing device relative to its surroundings based on analysis of the acquired data in accordance with the configuration data.

45 Claims, 11 Drawing Sheets

| Name | Bytes | Hex | Dec | Example | Scale | Units | Description |
|---|---|---|---|---|---|---|---|
| Message ID | 1 | 0x51 | 81 | | | | Message Identification |
| Sub Id | 1 | 0x01 | 1 | | | | Message Sub Id |
| Number of channels | 1 | | [1-n] | 3 | | | Number of channels (1 through n) to be configured through this message. 'n' can be 24. |
| Channel 1 configuration | 1 | | | 1 | | | Channel configuration. Configuration settings for various channels are described in Table 2. |
| ... | | | | | | | |
| Channels n configuration | 1 | | | 9 | | | Channel n connected to magnetometer Z axis |

FIG. 4

| Channel configuration setting | Physical sensor channel |
|---|---|
| 1 | Acceleration X-axis |
| 2 | Acceleration Y-axis |
| 3 | Acceleration Z-axis |
| 4 | Gyroscope X-axis |
| 5 | Gyroscope Y-axis |
| 6 | Gyroscope Z-axis |
| 7 | Magnetometer X-axis |
| 8 | Magnetometer Y-axis |
| 9 | Magnetometer Z-axis |
| 10 | Euclidean Norm or magnitude of acceleration (X, Y, Z) |
| 11 | Euclidean Norm or magnitude of angular rate (X, Y, Z) |
| 12 | Euclidean Norm or magnitude of magnetic field strength (X, Y, Z) |
| 13 | Normalized Acceleration X-axis |
| 14 | Normalized Acceleration Y-axis |
| 15 | Normalized Acceleration Z-axis |
| 16 | Normalized Gyroscope X-axis |
| 17 | Normalized Gyroscope Y-axis |
| 18 | Normalized Gyroscope Z-axis |
| 19 | Normalized Magnetometer X-axis |
| 20 | Normalized Magnetometer Y-axis |
| 21 | Normalized Magnetometer Z-axis |
| 22 | Reserved |

FIG. 5

| Name | Bytes | Hex | Dec | Example Dec | Scale | Units | Description |
|---|---|---|---|---|---|---|---|
| Message ID | 1 | 0x52 | 82 | | | | Message Identification |
| Sub Id | 1 | 0x01 | 1 | | | | Message Sub Id |
| Filter Index | 1 | | [1 – 9] | 5 | | | The Index defining a specific filter. In this example filter 5 is being defined. |
| Input channel | 1 | | [1 – n] | 3 | | | Channel number for the filter setting. |
| Output channel | 1 | | [1 – n] | 16 | | | Channel number for the filter setting. Output channel setting are found in Table 4. In this example the filtered output channel is 16 for feature computation block. |
| Number of Numerator coefficients | 1 | | [1 – N] | 2 | | | Number of numerator coefficients in filter transfer function as described in equation 1 above. In this example 2 coefficients |
| Numerator coefficient 1 | 3 | | | 781321 | $\times 10^{-7}$ | | Numerator coefficient 1. In this example the numerator coefficient is 0.0781321 |
| Numerator coefficient N | 3 | | | 12345678 | $\times 10^{-7}$ | | Numerator coefficient 2. In this example, the numerator coefficient is 1.2345678 |
| Denominator coefficient number | 1 | | [1 – M] | 2 | | | Number of denominator coefficients M in filter transfer function as described in equation 1 above. In this example 2 coefficients |
| Denominator coefficient 1 | 3 | | | | $\times 10^{-7}$ | | Denominator coefficient 1 which is scaled by $10^{-7}$ |
| Denominator coefficient n | 3 | | | | $\times 10^{-7}$ | | Denominator coefficient 2 which is scaled by $10^{-7}$ |
| ... | | | | | | | |

FIG. 6

| Output Channel Index | Identifier name |
|---|---|
| D1 | 1 |
| D2 | 2 |
| D3 | 3 |
| D4 | 4 |
| D5 | 5 |
| D6 | 6 |
| D7 | 7 |
| D8 | 8 |
| D9 | 9 |
| D10 | 10 |
| D11 | 11 |
| D12 | 12 |
| D13 | 13 |
| D14 | 14 |
| D15 | 15 |
| D16 | 16 |

FIG. 7

| Name | Bytes | Hex | Dec | Example (Dec) | Scale | Units | Description |
|---|---|---|---|---|---|---|---|
| Message ID | 1 | 0x53 | 83 | | | | Message Identification |
| Sub Id | 1 | 0x01 | 1 | | | | |
| Clock Index | | | [1 : 15] | 1 | | | This index is used to define a new clock |
| Reset Trigger index | | | [1: | 3 | | | The output of clock to generate a trigger is carried over this reset trigger. Definition of Reset trigger in Table 6. In this example, the clock trigger for clock 1 will be carried over Reset Trigger 3. |
| Clock duration | 2 | | | 1000 | X 10^-3 | seconds | Clock duration after which a trigger event is generated. In this example clock trigger is being set for 1 second. |

FIG. 8

| Reset trigger name | Index |
|---|---|
| Reset 1 | 1 |
| Reset 2 | 2 |
| ... | ... |
| Reset 15 | 15 |

FIG. 9

| Name | Bytes | Hex | Dec | Example (Dec) | Scale | Units | Description |
|---|---|---|---|---|---|---|---|
| Message ID | 1 | 0x53 | 84 | | | | Message Identification |
| Sub Id | 1 | 0x01 | 1 | | | | Message Sub Id |
| Number of features to be configured | 1 | | [1 – P] | | | | Number of features in the algorithm that need to be configured. |
| Feature index | 1 | | [1 – n] | 2 | | | Index of the feature being defined. In this example Feature 2 is being defined as maxima. |
| Feature 1 | 1 | | [1 – 11] | 1 | | | Feature 1 to be configured. In this example, value of 1 == Maxima. |
| Feature 1 number of input channels | 1 | | [1 – 2] | 1 | | | Correlation feature will have two input channels. All other features will have one input channel. |
| Feature 1 input channel 1 | 1 | | [1 – 9] | 1 | | | The input channel 1 can be either the raw sensor data channel or one of the output channels |
| Feature 1 input channel 2 | 1 | | [1 – 9] | 1 | | | The input channel 2 can be either the raw sensor data channel or one of the output channels |
| Input Reset Trigger | 1 | | [0 – n] | 1 | | | Input reset trigger is selected. If this feature is running in a trigger generation mode (for example, Zero Crossing, Peak Detector), then it is set as 0. In this example input reset trigger is 1. |
| Feature 1 Output | 1 | | [1 – n] | 83 | | | Feature 1 output. It points to output buffer or reset trigger. In this example the output is stored in Buffer3 address. If the feature is running in trigger generation mode, the reset trigger is specified here. |

FIG. 10

| Feature Buffer name | Index |
|---|---|
| Buffer 1 | 1 |
| Buffer 2 | 2 |
| Buffer 3 | 3 |
| Buffer 4 | 4 |
| ... | |
| Buffer N | N |

FIG. 11

| Computation Block Name | Index | Description | Modes Available |
|---|---|---|---|
| Maxima | 1 | Maxima value for a given window of data | Feature Mode |
| Minima | 2 | Calculates Minimum value since last reset trigger | Feature Mode |
| Mean | 3 | Calculates the mean value since last reset trigger | Feature Mode |
| Variance | 4 | Calculates the variance value since last reset trigger | Feature Mode |
| Zero Crossings | 5 | Feature mode calculates number of zero crossings, in trigger mode generates a trigger at every zero crossing detected | Feature Mode, Trigger Mode |
| Positive Zero Crossings | 6 | Feature mode calculates number of positive zero crossings(when signal is transition from negative to positive value)., in trigger mode generates a trigger at every positive zero crossing detected | Feature Mode, Trigger Mode |
| Negative Zero Crossings | 7 | Feature mode calculates number of negative zero crossings(when signal is transition from positive to negative value)., in trigger mode generates a trigger at every negative zero crossing detected | Feature Mode, Trigger Mode |
| Peak Detector | 8 | Feature mode calculates number of peaks, in trigger mode generates a trigger at every peak detected | Feature Mode, Trigger Mode |
| Positive Peak Detector | 9 | Feature mode calculates number of positive peaks (Peak detected when slope of signal transitions from positive to negative). In trigger mode generates a trigger at every peak detected | Feature Mode, Trigger Mode |
| Negative Peak Detector | 10 | Feature mode calculates number of peaks ((Peak detected when slope of signal transitions from negative to positive)., In trigger mode generates a trigger at every peak detected | Feature Mode, Trigger Mode |
| Peak-to-peak value | 11 | Computes peak-to-peak value of the signal. | Feature Mode |
| Energy | 12 | Square sum of all the element values in the defined window | Feature Mode |
| Duration | 13 | Total time for the prescribed event. | Feature Mode |
| Correlation | 14 | | Feature Mode |
| Reserved | 15 | | |
| Reserved | 16 | | |
| Reserved | 17 | | |

FIG. 12

| Name | Bytes | Hex | Dec | Example (Dec) | Scale | Units | Description |
|---|---|---|---|---|---|---|---|
| Message ID | 1 | 0x54 | 85 | | | | Message Identification |
| Sub id | 1 | 0x01 | 1 | | | | Message Sub Id |
| Output Destination of the classification block | 1 | | | 1 | | | Either an interrupt or output buffer. If it is an interrupt value is 1, if it is to be written in buffer the value is 2. |
| Number of nodes in Decision Tree | 1 | | | 100 | | | In this example, the message id is listed. |
| Node index | | | | | | | Identifier associated with a specific node. |
| Feature buffer index | | | | | | | Feature Buffer index provides the location where the value of feature to be compared is stored. |
| Threshold | 4 | | | 12345678 | X 10^-7 | | Threshold value which is scaled by 10^-7. Here Threshold is 1.2345678 |
| Comparison condition | 1 | | | 2 | | | In this example the operation >= is chosen. |
| Left node index | | | | | | | This is index of next Node which is traversed if the True condition is satisfied. This is 0 if this is a leaf i.e. tree terminates here and output the result |
| Right node index | | | | | | | This is index of next Node which is traversed if the False condition is satisfied. This is 0 if this is a leaf i.e. tree terminates here and output the result |
| Left Result | | | | | | | This is a leaf where the result of decision (if any) is provided. If the decision is true. In case there is no result from the comparison, the value to written is 99 corresponding to No Op (No operation) |
| Right Result | | | | | | | This is a leaf where the result of decision (if any) is provided. If the decision is false. In case there is no result from the comparison, the value to written is 99 corresponding to No Op (No operation) |
| ... | | | | | | | |
| Node n | | | | | | | This is for next node with the same sequence as above. |

FIG. 13

| Operation | Index |
|---|---|
| <= | 1 |
| >= | 2 |
| == | 3 |
| != | 4 |

FIG. 14

RECONFIGURABLE SENSOR UNIT FOR ELECTRONIC DEVICE

PRIORITY CLAIM

This application is a continuation in part of U.S. patent application Ser. No. 14/749,118 which was filed on Jun. 24, 2015, now pending, which claims the benefit of U.S. Provisional Application No. 62/121,104 which was filed on Feb. 26, 2015. The content of each patent application identified above is incorporated by reference in its entirety to the maximum extent allowable by law.

TECHNICAL FIELD

This disclosure relates to the field of sensors, and more particularly, to reconfigurable sensors for electronic devices. This disclosure also relates to techniques for configuring those sensors.

BACKGROUND

Portable electronic devices such as smartphones, smartwatches, other wearables, and tablets are ever more popular in the world today. Certain functions of these devices depend on the device having a knowledge of the device's orientation, or of conditions of the environment in which the device currently resides. For example, a smartphone may rotate its user interface from a portrait view to a landscape view based upon the orientation in which the smartphone is held. As another example, a smartwatch may activate its display or alter the brightness of its display based upon the orientation in which the smartwatch is held, or based upon the light in the environment in which the smartwatch resides, respectively. Such portable electronic devices may also log the physical activity of a user. For example, a smartphone or smartwatch may count the number of steps taken by a user.

In order to determine the orientation of the device or conditions of the environment in which the device resides, sensors such as accelerometers and gyroscopes are employed. Typically, the electronic device includes a system on chip (SOC) that receives raw data from the sensors, and then determines the device orientation or conditions of the environment.

While this approach is effective and enables the electronic device to perform commercially desirable functions, further features may yet be desired. Therefore, further development is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device disclosed herein includes a printed circuit board (PCB) having at least one conductive trace thereon and a system on chip (SoC) mounted on the PCB and electrically coupled to the at least one conductive trace. A sensor chip is mounted on the PCB in a spaced apart relation with the SoC and is electrically coupled to the at least one conductive trace such that the sensor chip and SoC are electrically coupled. The sensor chip itself includes at least one sensing device and a control circuit. The control circuit is configured to receive configuration data as input, the configuration data including sense channel configuration, clock configuration, feature configuration, and classification configuration. Data is acquired from the at least one sensing device in accordance with the sense channel configuration, and triggers for feature computation are generated in accordance with the clock configuration or events relating to physical phenomena. Features of the data are computed in response to the triggers and in accordance with the feature configuration. A context of the electronic device relative to its surroundings is determined based on the computed features and in accordance with the classification configuration, and the context is output.

Also disclosed herein is a sensor chip mounted on a printed circuit board (PCB) and electrically coupled to a system on chip (SoC) mounted on the PCB via at least one conductive trace. The sensor chip includes at least one sensing device, and a control circuit. The control circuit is configured to receive configuration data as input, and acquire data from the at least one sensing device in accordance with the configuration data. The control circuit classifies a context of the at least one sensing device relative to its surroundings based on analysis of the acquired data in accordance with the configuration data.

BRIEF DESCRIPTION OF THE DRAWINGS

FIG. 4 is a table showing the format of a sense channel configuration message for communication to the configuration registers of FIG. 3.

FIG. 5 is a table showing content that may be contained in the sense channel configuration message of FIG. 4.

FIG. 6 is a table showing the format of a filtering configuration message for communication to the configuration registers of FIG. 3.

FIG. 7 is a table showing content that may be contained in the filtering configuration message of FIG. 6.

FIG. 8 is a table showing the format of a clock configuration message for communication to the configuration registers of FIG. 3.

FIG. 9 is a table showing content that may be contained in the clock configuration message of FIG. 8.

FIG. 10 is a table showing the format of a feature configuration message for communication to the configuration registers of FIG. 3.

FIG. 11 is a table showing content that may be contained in the feature configuration message of FIG. 10.

FIG. 12 is a table showing other content that may be contained in the feature configuration message of FIG. 10.

FIG. 13 is a table showing the format of a classification configuration message for communication to the configuration registers of FIG. 3.

FIG. 14 is a table showing content that may be contained in the classification configuration message of FIG. 13.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
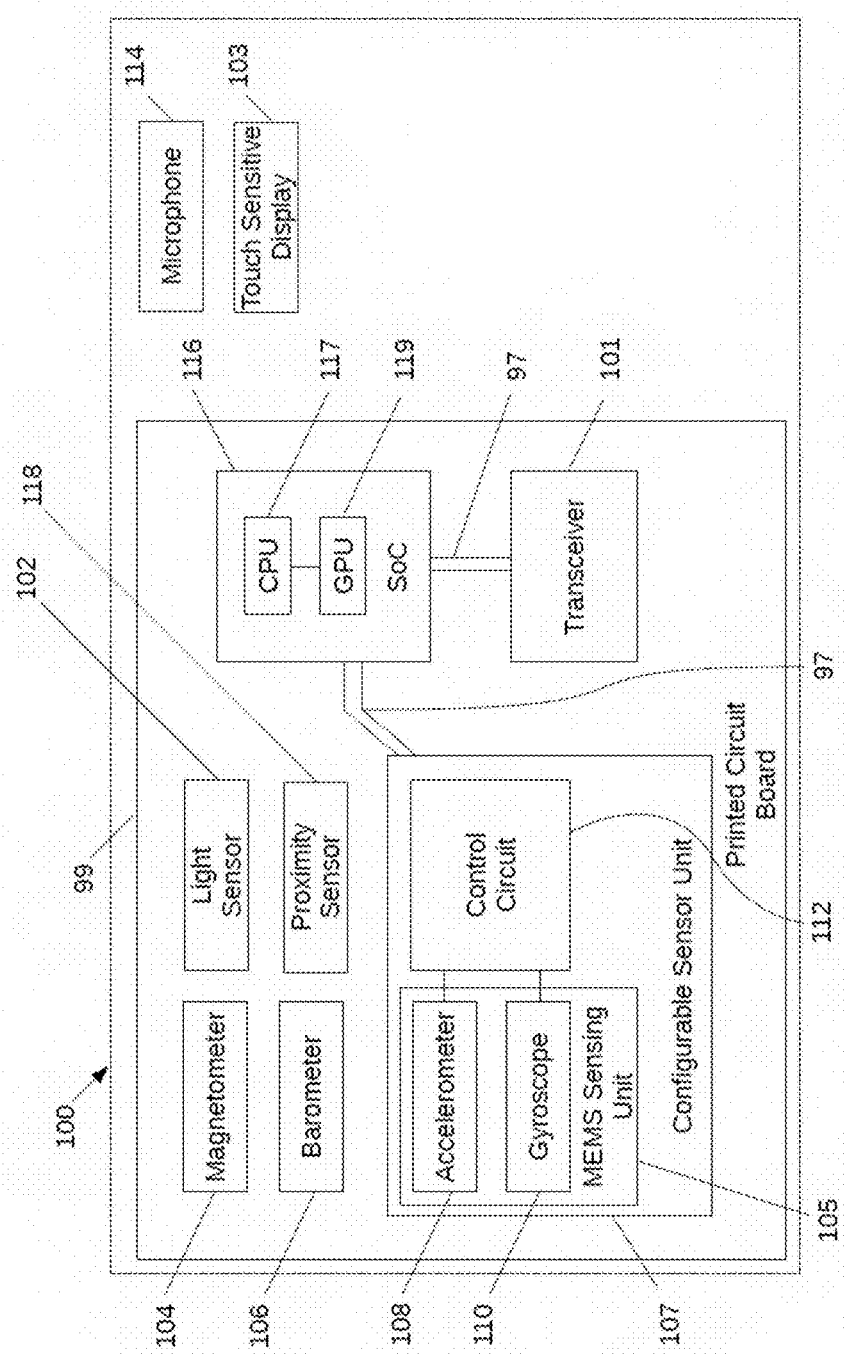
FIG. 1 is a schematic block diagram of an electronic device including a reconfigurable sensor unit in accordance with one embodiment of this disclosure.

With initial reference to FIG. 1, an electronic device 100 is now described. The electronic device 100 may be a smartphone, tablet, smartwatch, or other wearable device. The electronic device 100 includes a printed circuit board (PCB) 99 having various components mounted thereon. Conductive traces 97 printed on the PCB 99 serve to electrically couple the various components together in a desired fashion.

A system on chip (SoC) 116, which comprises a central processing unit (CPU) 117 coupled to a graphics processing unit (GPU) 119, is mounted on the PCB 99. Coupled to the SoC 116 are a transceiver 101 via which the SoC 116 can communicate with remote servers over the internet, and a touch sensitive display 103 via which the SoC 116 may display output and receive input. A variety of sensors are coupled to the SoC 116, including a light sensor 102 for determining the level of ambient light in the environment in which the electronic device 100 resides, a magnetometer 104 used to determine the orientation of the electronic device 100 with respect to the magnetic field of the Earth, a barometer 106 used to determine the air pressure in the environment (and thus, the altitude of the electronic device 100), a microphone 114 used to detect audible noises in the environment, and a proximity sensor 118 used to determine proximity of the user with respect to the electronic device 100.

A configurable sensor unit 107 is mounted on the PCB 99 spaced apart from the SoC 116, and coupled thereto by the conductive traces 97. For illustrative purposes only, for example, the configurable sensor unit 107 includes an accelerometer 108 and/or gyroscope 110 coupled to a control circuit 112. The accelerometer 108 is used for determining accelerations experienced by the electronic device 100, and the gyroscope 110 is used to determining an orientation of the electronic device 100 with respect to the environment. It should be understood that any now existing or future developed type of sensors could be used with this disclosure, the scope of which is not limited by the type of configurable sensors used. The configurable sensor unit 107 may be formed from discrete components and/or integrated components and/or a combination of discrete components and integrated components, and may be formed as a package.

As illustrated in FIG. 1 as an example, configurable sensor unit 107 is not a portion of the SoC 116, and is a separate and distinct component from the SoC 116. The sensor unit 107 and the SoC 116 are separate, distinct, mutually exclusive chips mounted on the PCB 99 at different locations and coupled together via the conductive traces 97. It should be understood that this example configuration is just one optional configuration and SOC 116 and/or the features/function thereof could be integrated with the sensor unit 107, which is also included in the scope of this disclosure.

In operation, the SoC 116 may acquire data from the various sensors 102, 103, 104, 106, 114, and 118 at an acquisition rate, and may process the data so as to determine a context of the electronic device 100 relative to its environment. The acquisition rate for some of these various sensors, in some operating scenarios, may be relatively low due to the nature of the contexts to be determined from these sensors not necessitating a higher acquisition rate. Therefore, power consumption as a result of acquisition of data from these various sensors may be relatively low. Contexts will be explained in detail.

On the other hand, the contexts to be determined from some other sensor, for example, in some operating scenarios, the accelerometer 108 and/or the gyroscope 100 may involve the use of a higher acquisition rate than the other sensors. Therefore, to save power, a control circuit 112 of the configurable sensor unit 107 that consumes less power than the SoC 116 may be used to perform acquisition of data from the accelerometer 108 and/or the gyroscope 110, and may perform some processing of that data. So as to provide the same level of configurability as would be present were the SoC 116 performing the acquisition and processing of the data from the accelerometer 108 and/or the gyroscope 110, the sensor unit 107 may receive configuration data as input.

In operation, the control circuit 112, as stated, receives the configuration data as input. The control circuit 112 acquires data from the accelerometer 108 and/or the gyroscope 110, and processes the data so as to generate a context of the electronic device 100 relative to its surroundings. This processing is performed by the control circuit 112 using a processing technique operating in accordance with the configuration data received as input. The processed data is then output by the control circuit 112 to the SoC 116 for use thereby.

Figure 2:
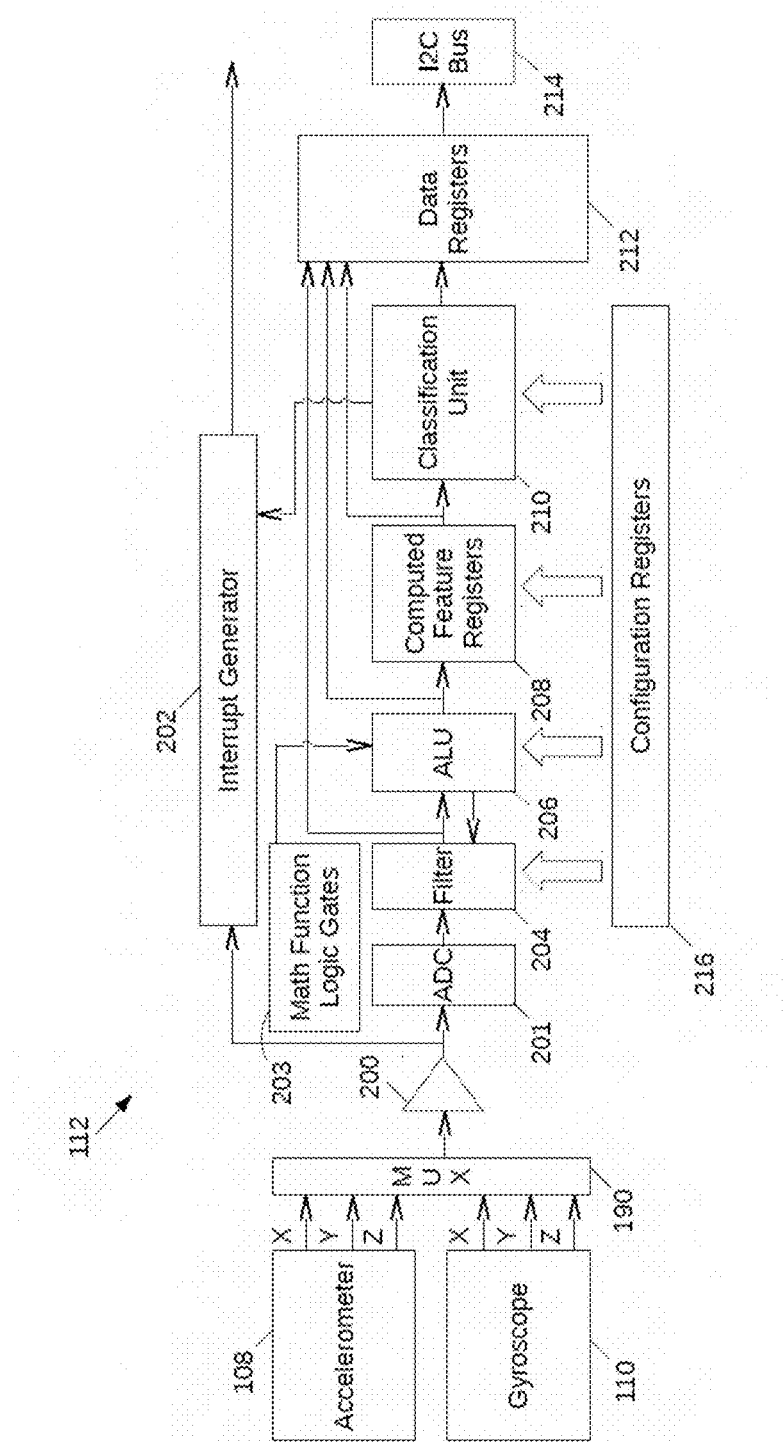
FIG. 2 is a schematic block diagram of one embodiment of the control circuit of the electronic device of FIG. 1.

With additional reference to FIG. 2, sample details of an example control circuit 112 are now given. Although specifics will be described, it should be understood that the functions of the control circuit 112 may be achieved through different circuit implementations with different circuit topologies, elements and/or units, and made from suitable components, and that any and all such circuit implementations are within the scope of this disclosure. It should also be understood that while certain functions and operations are described as being performed by certain components of the control circuit 112, the performance of those functions and operations by any suitable hardware is contemplated and within the scope of this disclosure.

The control circuit 112 includes a multiplexer 190 that receives three dimensional data in the X, Y, and Z directions from the accelerometer 108 and gyroscope 110. The output of the multiplexer 190 is fed to a charge pump 200, which in turn feeds its output to a filter 204. The filter feeds its output to a programmable logic device such as an arithmetic logic unit (ALU) 206, which feeds its output to computed feature registers 208. A classification unit 210 reads data from the computer feature registers 210, and outputs contexts to data registers 212. The data registers 112 are coupled to an I2C bus interface 214. In addition, an interrupt generator 202 is coupled to the output of the charge pump 200, and the output thereof may be read by the SoC 116. Configuration registers 216 are coupled to the filter 204, ALU 206, computed feature registers 208, and classification unit 210. In addition to the connections described above, the outputs of the filter 204, ALU 206, and computed feature registers 208 are also each coupled to the data registers 212.

In operation, the accelerometer 108 and gyroscope 110 each output data for the three spatial dimensions X, Y, Z. This data is received by the multiplexer 190, which selectively multiplexes that data to the charge pump 200. The charge pump 200 outputs that data to the filter 204 which may be an analog or digital filter. The filter 204 filters the data and outputs it to an arithmetic logic unit (ALU) 206.

The ALU 206 serves to extract features of the data itself, such as a mean acceleration over a given period of time, variance of acceleration, radian acceleration, number of acceleration peaks, number of zero crossings in the filtered acceleration signal, peak acceleration values, linear acceleration values, energy in band, mean of roll, pitch, and yaw, variance of roll, pitch, and yaw, mean of linear acceleration, variance of linear acceleration, etc. This list of features that may be extracted from the data is not intended to be exhaustive. Indeed, the ALU may extract any useful features from accelerometer 108 or gyroscope 110 data, and all such features are within the scope of this disclosure.

The computed feature registers 208 store the features extracted by the ALU 206. The classification unit 210 may be a separate ALU, and classifies the context of the electronic device 100 based upon the features extracted by the ALU and stored in the computed feature registers 208. For example, the context of the electronic device 100 may be where on the user's body it is carried (i.e. in pocket, in hand, in holster), a current method of locomotion of the user (i.e. running, walking, driving, bicycling, climbing stairs), or an orientation of the electronic device 100 with respect to gravity. Another example context may be movement of the electronic device 100 in a gesture, such as a user raising a smartwatch in to a position to view the screen thereof, shaking the electronic device 100, double tapping the touch sensitive display 103 of the electronic device 100, rotating the electronic device 100 either clockwise or counterclockwise, and swiping the touch sensitive display 103 to the left, right, top, or bottom.

The contexts classified by the classification unit 210 are then stored in the data registers 212, and may in turn be read out by the I2C bus 214 to the SoC 116. The SoC 116 then uses the classified contexts in its operations. The interrupt generator 202 serves to generate interrupts for the SoC 116 so as to facilitate communication between the configurable sensing unit 107 and the SoC 116.

In some applications, the multiplexer 190 may receive additional data from the SoC 116. For example, the SoC 116 may send additional data from the light sensor 102, magnetometer 104, barometer 106, microphone 114, proximity sensor 118, or touch sensitive display 103 to the multiplexer 190, such that this data may be used by the other components of the sensor unit 107.

The described functionalities of the filter 204, ALU 206, and classification unit 210 operate in accordance with configuration data stored in the configuration registers 216. For example, the configuration data may be changeable parameters of the processing technique performed by the control circuit 112. Thus, the configuration data may change the pre-processing performed by the control circuit 112 by either replacing the filtering technique performed by the filter 204, or by replacing the values of the coefficients of the filter 204.

The configuration data may control the performance level of the sensor unit 107 by altering the balance between latency, accuracy, and power consumption. This balance may be changed by altering the acquisition rate of the data, and thus the rate at which the multiplexer 190 switches from among its various inputs. This balance may also be changed by altering the range of accepted values of the data, for example by the ALU 206 ignoring data outside of the range of accepted values when extracting or computing features of the data.

The configuration data may change the techniques used by the ALU 206 to extract and compute the features from the data. The ALU 206 may be programmed to extract and compute a plurality of features from the data, and the configuration data may serve to select a subset of that plurality of features for the ALU 206 to actually extract and compute. In some cases, the configuration data may program or reprogram the ALU 206 for extracting and computing different features. The configuration data may also program or reprogram the way in which the ALU 206 extracts and computes any of the features.

The balance between latency, accuracy, and power consumption may also be altered by the configuration data switching operation of the sensor unit 107 between a lower power consumption mode and a higher power consumption mode. In the lower power consumption mode, the sensor output data rate (ODR) is lower and ALU 206 extracts and computes a smaller subset of features of the plurality of features which the ALU 206 is programmed to extract and compute, whereas in the higher accuracy mode, the ALU 206 extracts and computes a larger subset (or all) of the features of the plurality of features which the ALU 206 is programmed to extract and compute. When these lower power consumption and higher accuracy modes are used, the sensor unit 107 operates in the lower power consumption mode until features of a threshold value or values are extracted by the ALU 206, at which point the sensor unit 107 switches to operation in the higher power consumption mode.

The configuration data may control the techniques used by the classification unit 210 for classifying the features extracted and computed by the ALU 206 and stored in the computed feature registers 208, for example by using a decision tree. The classification unit 210 may be programmed to classify the features into a plurality of contexts, and the configuration data may select a subset of that plurality of contexts for the classification unit 210 to classify. In addition, the configuration data may program or reprogram the classification unit 210 for classifying and determining different contexts. The configuration data may also program or reprogram the way in which the classification unit 210 classifies and determines the different contexts.

The SoC 116 may receive additional or new configuration data from the transceiver 101, and it may then pass this additional or new configuration data to the configuration registers 216. In some instances, the SoC 116 may generate the additional or new configuration data itself, for example based upon user input, and then pass the additional or new configuration data to the configuration registers 216.

It should be understood that the configuration data stored in the configuration registers 216 may operate on the various components in a variety of ways. For example, the configuration data may directly provide the techniques or algorithms used by the various components, may select which pre-programmed techniques or algorithms are to be used, may provide the coefficients used by the techniques or algorithms, or may replace standard techniques, algorithms, or coefficients. Thus, the various components may operate in a first fashion in the absence of the configuration data, and in a second fashion in the presence of the configuration data. The configuration registers 216 are reprogrammable on the fly by the SoC 116, and thus the alteration of the operation of the sensor unit 107 may not involve the changing of firmware. Therefore, the various components may be considered to be fully programmed at a first point in time, and that programming may be changed by the configuration data at a second point in time. For example, the execution of different applications by the SoC 116 may cause reprogramming of the configuration registers 216 on the fly. An example is when the electronic device 100 is acting as an activity tracker, and the configuration registers 216 are loaded with different configurations as a function of user input to indicate which activity they are going to undertake (e.g. walking, cycling, weight lifting, etc).

In addition to the power savings provided by this sensor unit 107, the sensor unit 107 facilitates easier manufacture of electronic devices 100. Due to the configuration data being easily changeable in the configuration registers 116, different sensor units 107 need not be stocked by a manufacturer for different electronic devices 100. The same design of sensor unit 107 may be used by a manufacturer for different electronic devices 100, with differences in the configuration data stored in the configuration registers 116 of each, thereby easing manufacturing supply chain constraints.

Figure 3:
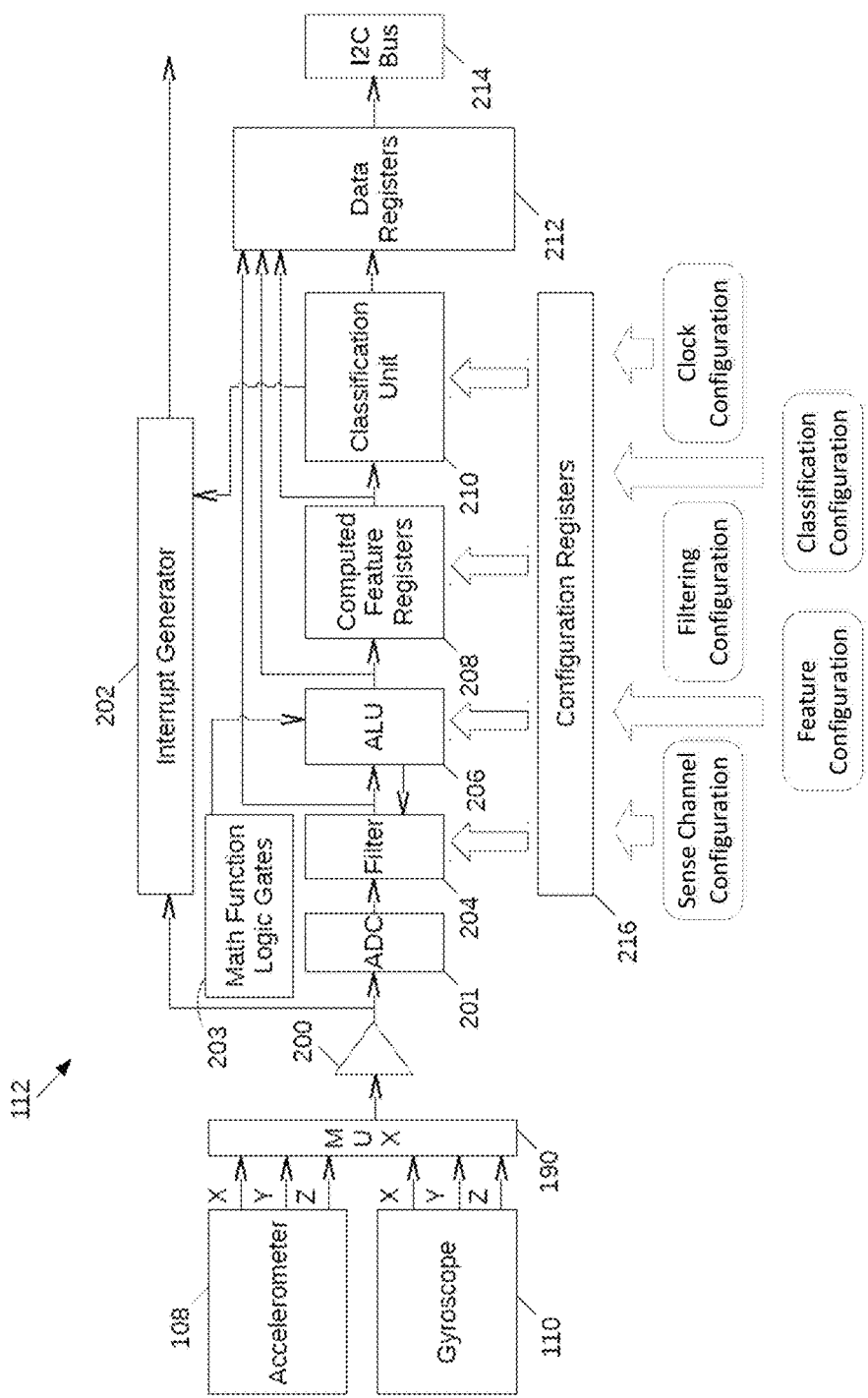
FIG. 3 is a schematic block diagram of one embodiment of the control circuit of the electronic device of FIG. 1.

With reference to FIG. 3, a sample implementation of the electronic device 100 and techniques for configuring the electronic device 100 is now described. Here, a series of configuration messages are sent to the configuration registers 216. The information contained within the configuration messages is in turn potentially used by the math function logic gates 203, filter 204, ALU 206, computed feature registers 208, and classification unit 210. The configuration messages may be a sense channel configuration message, filtering configuration message, clock configuration message, feature configuration message, and classification configuration message.

The sense channel configuration message serves to define which sensors or combinations of sensors (i.e. accelerometer 108, gyroscope 110, etc) data is acquired from, and/or which channels of the selected sensors the data is acquired from, and/or which processed versions of that data (e.g. derived sensor data) is to be used. As shown in FIG. 4, the sense channel configuration message contains a message ID field which holds an identifier of what type of message it is (i.e. here, that it is a sense channel configuration message), a sub ID field which holds a further identifier of what type of message it is, a field containing a number of channels along which to acquire data, and a configuration field for each channel. Shown in FIG. 5 are the different ways the contents of the configuration field defines each channel. For example, a given channel may be a X, Y, or Z axis of the accelerometer 108 or gyroscope 110 or magnetometer 104 (shown in FIG. 1), Euclidean norms or magnitudes of acceleration along any axis, Euclidean norms or magnitudes of angular rate along any axis, Euclidean norms or magnitudes of magnetic field along any axis, and/or normalized values of any of the preceding.

The filtering configuration message defines the filter applied to acquired data by the filter 204. The filter 204, as explained above, is a digital filter with a transfer function defined by:

$$H(z) = \frac{\sum_{l=0}^{N} a_l z^{-l}}{\sum_{k=0}^{M} b_k z^{-k}}$$

In particular, the contents of the filter configuration message define the constants of the numerator and denominator of the digital filter applied by the filter 204. Using the numerator and denominator as described above, almost any filter such as low pass, high pass, band pass can be described.

The format of the filtering message is shown in FIG. 6. In particular, the filtering message includes a message ID field which holds an identifier of what type of message it is (i.e. here, that it is a filtering configuration message), a sub ID field which holds a further identifier of what type of message it is, input and output channel fields, and numerator and denominator coefficient fields. Identifier names correlated to output channels are shown in FIG. 7.

The clock configuration message defines triggers to be used by the ALU 206 in computing features of the data. The triggers may be defined as being generated at periodic intervals (ie. one per second), or may be defined as being generated at detectable events within the data. For example, a detectable event may be a zero amplitude crossing of the data (in the positive direction, in the negative direction, or either), or a peak of the data (positive, negative, or either).

The format of the clock configuration message is shown in FIG. 8. In particular, the filtering message includes a message ID field which holds an identifier of what type of message it is (i.e. here, that it is a clock configuration message), a sub ID field which holds a further identifier of what type of message it is, a clock index field used to define a clock, a reset trigger index used to generate an index for resetting the trigger, and a clock duration field used to define a clock duration after which a trigger is generated. Sample reset trigger names and indexes are shown in FIG. 9.

The feature configuration message defines feature of the data to be computed by the ALU 206, and these features may be computed at the triggers. For example, a condition of the data may be a zero amplitude crossing of the data (e.g. in a positive direction, in a negative direction, or either), and the ALU 206 may count the number of occurrences of the zero amplitude crossing between each trigger. A different condition of the data may be a characteristic of the data computed at the triggers. For example, the condition may be a data maxima, a data minima, a data mean, a data variance, and the energy in the band at a trigger, or between two triggers. Other sample conditions may be an amplitude peak (positive, negative, or either), a peak to peak value, a total energy between triggers, or a total time elapsed during the feature.

The format of the feature configuration message is shown in FIG. 10. In particular, the feature configuration message includes a message ID field which holds an identifier of what type of message it is (i.e. here, that it is a feature configuration message), a sub ID field which holds a further identifier of what type of message it is, a number of features to be configured, a feature index, and definitions for feature numbers, feature input channels, feature output channels, and input reset triggers. Shown in FIG. 11 are indices for the feature buffers that may be used on the feature outputs, and shown in FIG. 12 are the various features that may be computed at the feature channels. It should be noted that some entries of the table of FIG. 12 also denote triggers for use with the clock configuration message, and these entries are so labeled.

Figure 14:
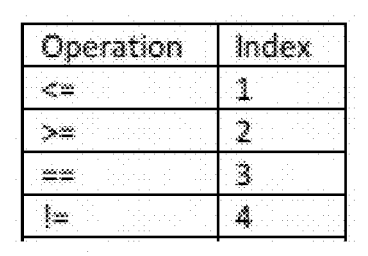

The classification configuration message defines a decision tree to be used in classifying and determining context of the electronic device 100 relative to its surroundings. The format of the classification configuration message is shown in FIG. 13. The classification configuration message includes message ID and sub ID fields as with the other configuration messages, a field for the output destination, and then data fields defining the nodes, node indices, and results of the decision tree. Shown in FIG. 14 are the operations that may be performed at the nodes, and their respective indices.

It should be appreciated that via the various configuration messages described above, the control circuit 112 may be configured in a variety of ways to determine a variety of contexts of the electronic device 100. For example, the control circuit 112 may be determined to determine each time a user carrying the electronic device 100 has taken a step. In such a case, the configuration messages may be as follows: the sense channel configuration message may set the ADC 201 to convert the X, Y, and Z channels of the accelerometer, together with a Euclidean norm, for input; the filtering configuration message may set the filter 204 to be a low pass filter; the clock configuration message may set the triggers as amplitude threshold crossings of the data in the positive direction; the feature configuration message may set the ALU 206 to determine the peak to peak value between two triggers, the energy in band for a two second window, and the duration between two triggers; and the classification configuration message may set the classification unit 210 to determine that a user has taken a step as a function of a duration since a last amplitude threshold crossing of the data in the positive direction, a peak to peak amplitude between such amplitude threshold crossings, and the energy in band for two seconds.

A sample of the decision tree for determining the steps, as defined by the classification configuration message, is as follows:

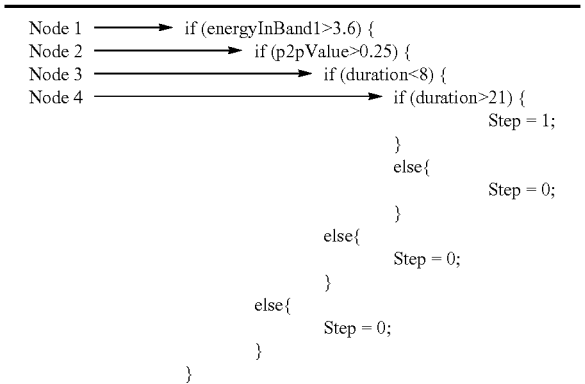

This example decision tree shows the nodes as configured, the operators and operands of the nodes as configured, and the steps to be taken as a function of the operator and operands.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A sensor chip mounted on a printed circuit board (PCB) and electrically coupled to a system on chip (SoC) mounted on the PCB via at least one conductive trace, the sensor chip comprising:
at least one sensing device; and
a control circuit configured to:
receive configuration data as input, the configuration data including a feature configuration and a classification configuration;
acquire data from the at least one sensing device;
compute features of the data based on the data and the feature configuration;
classify a context of the sensor chip relative to its surroundings based on the computed features of the data and in accordance with the classification configuration, and
output the context.

2. The sensor chip of claim 1, wherein the data further includes a sense channel configuration and a clock configuration; wherein the data is acquired from the at least one sensing device in accordance with the sense channel configuration; wherein the control circuit is further configured to generate triggers for the feature computation in accordance with the clock configuration; and wherein the features are computed in response to the triggers.

3. The sensor chip of claim 1, wherein the configuration data further comprises a filtering configuration; and wherein control circuit is further configured to filter the data in accordance with the filtering configuration prior to computation of the features of the data.

4. The sensor chip of claim 3, wherein the filtering configuration defines coefficients of a digital filter to be applied to the data.

5. The sensor chip of claim 4, wherein the filtering configuration defines numerator and denominator coefficients of the digital filter.

6. The sensor chip of claim 2, wherein the at least one sensing device is configured for measuring data at different channels; wherein the sense channel configuration specifies at which of the different channels to acquire data; and wherein the control circuit acquires the data from the specified channels of the at least one sensing device.

7. The sensor chip of claim 6, wherein the different channels comprise different axes along which the at least one sensing device of capable of measuring data.

8. The sensor chip of claim 2, wherein the at least one sensing device comprises a plurality of sensing devices; wherein the sense channel configuration specifies at least one sensing device of the plurality of sensing devices to acquire the data from; and wherein the control circuit acquires the data from the specified at least one sensing devices.

9. The sensor chip of claim 8, wherein the sense channel configuration specifies more than one of the plurality of sensing devices to acquire data from; and wherein the control circuit acquires the data from the specified ones of the plurality of sensing devices.

10. The sensor chip of claim 2, wherein the clock configuration comprises a period of time after which a trigger is generated.

11. The sensor chip of claim 2, wherein the clock configuration comprises an event detectable within the data at which a trigger is generated.

12. The sensor chip of claim 11, wherein the event comprises a zero amplitude crossing of the data.

13. The sensor chip of claim 2, wherein the feature configuration comprises a number of occurrences of a condition of the data; and wherein the control circuit increments the number of occurrences as a function of the triggers.

14. The sensor chip of claim 13, wherein the condition of the data comprises a zero amplitude crossing of the data in a positive direction.

15. The sensor chip of claim 13, wherein the condition of the data comprises a zero amplitude crossing of the data in a negative direction.

16. The sensor chip of claim 1, wherein the feature configuration comprises at least one characteristic of the data; and wherein the control circuit computes the features as a function of the at least one characteristic.

17. The sensor chip of claim 16, wherein the at least one characteristic of the data comprises at least one of the group comprising: a data maxima, a data minima, a data mean, a data variance, an energy in band, and an event duration.

18. The sensor chip of claim 1, wherein the classification configuration comprises a decision tree.

19. The sensor chip of claim 1, wherein the at least one sensing device comprises at least one of the group comprising: an accelerometer, a gyroscope, a magnetometer, a barometer, a proximity sensor, a light sensor, and a microphone.

20. The sensor chip of claim 2, wherein the at least one sensing device comprises an accelerometer; wherein the data comprises acceleration data; wherein the control circuit computes the features of the acceleration data as a function of at least two triggers, and determines the context as whether a user carrying the sensor chip has performed a given movement as a function of the features and in accordance with the classification configuration.

21. The sensor chip of claim 20, wherein the acceleration data comprises tri-axis acceleration data.

22. The sensor chip of claim 20, wherein the acceleration data comprises an Euclidean norm of an acceleration vector.

23. The sensor chip of claim 20, wherein the configuration data further comprises a filtering configuration, the filtering configuration comprising at least one of a bandpass filter, a high pass filter, a low pass filter, and a notch filter; and wherein the control circuit is further configured to filter the data in accordance with the filtering configuration prior to computation of the features of the data.

24. The sensor chip of claim 20, wherein the clock configuration defines the triggers as amplitude threshold crossings of the acceleration data.

25. The sensor chip of claim 24, wherein the amplitude threshold comprises zero such that the triggers represent zero crossing events.

26. The sensor chip of claim 24, wherein the clock configuration defines the triggers as amplitude threshold crossings of the acceleration data from below the amplitude threshold to above the amplitude threshold.

27. The sensor chip of claim 26, wherein the feature configuration defines a feature as a peak to peak value between the at least two triggers.

28. The sensor chip of claim 26, wherein the feature configuration defines a feature as a duration of time between triggers.

29. The sensor chip of claim 26, wherein the feature configuration defines a feature as a peak to peak value between two triggers, a duration between two triggers, and an energy in band for a given period of time.

30. The sensor chip of claim 20, wherein the feature configuration defines a feature as energy in band for a given period of time.

31. The sensor chip of claim 30, wherein the feature configuration defines the given period of time as two seconds.

32. The sensor chip of claim 20, wherein the classification configuration defines a step as a function of the features.

33. The sensor chip of claim 32, wherein the classification configuration defines the step as a function each of the features having a given relationship with a given threshold.

34. A sensor chip mounted on a printed circuit board (PCB) and electrically coupled to a system on chip (SoC) mounted on the PCB via at least one conductive trace, the sensor chip comprising:
at least one sensing device;
a control circuit configured to:
receive configuration data as input;
acquire data from the at least one sensing device in accordance with the configuration data;
classify a context of the at least one sensing device relative to its surroundings based on analysis of the acquired data in accordance with the configuration data.

35. The sensor chip of claim 34, wherein the at least one sensing device is capable of measuring data at different channels; wherein the configuration data specifies at which of the different channels to acquire the data; and wherein the control circuit acquires the data from the specified channels of the at least one sensing device.

36. The sensor chip of claim 35, wherein the different channels comprises different axes along which the at least one sensing device is capable of measuring data.

37. The sensor chip of claim 34, wherein the at least one sensing device comprises a plurality of sensing devices; wherein the configuration data specifies at least one sensing device of the plurality of sensing devices to acquire the data from; and wherein the control circuit acquires the data from the specified at least one sensing devices.

38. The sensor chip of claim 37, wherein the configuration data specifies more than one of the plurality of sensing devices to acquire data from; and wherein the control circuit acquires the data from the specified ones of the plurality of sensing devices.

39. The sensor chip of claim 34, wherein the control circuit comprises a plurality of configuration registers into which the configuration data is received as input.

40. The sensor chip of claim 39, wherein the control circuit further comprises a programmable logic device configured to classify the context in accordance with the configuration data from the plurality of configuration registers.

41. An electronic device, comprising:
a printed circuit board (PCB) having at least one conductive trace thereon;
a system on chip (SoC) mounted on the PCB and electrically coupled to the at least one conductive trace;
a sensor chip mounted on the PCB in a spaced apart relation with the SoC and electrically coupled to the at least one conductive trace such that the sensor chip and SoC are electrically coupled;
wherein the sensor chip comprises:
at least one sensing device;
a control circuit configured to:
receive configuration data as input, the configuration data including sense channel configuration, clock configuration, feature configuration, and classification configuration;
acquire data from the at least one sensing device in accordance with the sense channel configuration;
generate triggers for feature computation in accordance with the clock configuration;
compute features of the data in response to the triggers and in accordance with the feature configuration;
classify a context of the electronic device relative to its surroundings based on the computed features and in accordance with the classification configuration, and
output the context.

42. The electronic device of claim 41, wherein the at least one sensing device is capable of measuring data at different channels; wherein the sense channel configuration specifies at which of the different channels to acquire data; and wherein the control circuit acquires the data from the specified channels of the at least one sensing device.

43. The electronic device of claim 42, wherein the different channels comprises different axes along which the at least one sensing device of capable of measuring data.

44. The electronic device of claim 41, wherein the at least one sensing device comprises a plurality of sensing devices; wherein the sense channel configuration specifies at least one sensing device of the plurality of sensing devices to acquire the data from; and wherein the control circuit acquires the data from the specified at least one sensing devices.

45. The electronic device of claim 44, wherein the sense channel configuration specifies more than one of the plurality of sensing devices to acquire data from; and wherein the control circuit acquires the data from the specified ones of the plurality of sensing devices.

* * * * *